United States Patent
Demski et al.

(10) Patent No.: US 11,807,157 B2
(45) Date of Patent: Nov. 7, 2023

(54) METHOD OF CONTROLLING AN AGRICULTURAL VEHICLE LIGHTING SYSTEM AND SYSTEM THEREOF

(71) Applicant: DEERE & COMPANY, Moline, IL (US)

(72) Inventors: Nathan R. Demski, Durango, IA (US); Brian M. Huenink, Cedar Grove, WI (US); Eric A. Keen, Manhattan, KS (US); Michael R. Gratton, Asbury, IA (US)

(73) Assignee: DEERE & COMPANY, Moline, IL (US)

(*) Notice: Subject to any disclaimer, the term of this patent is extended or adjusted under 35 U.S.C. 154(b) by 15 days.

(21) Appl. No.: 17/193,793

(22) Filed: Mar. 5, 2021

(65) Prior Publication Data

US 2021/0402914 A1    Dec. 30, 2021

Related U.S. Application Data

(60) Provisional application No. 63/045,959, filed on Jun. 30, 2020.

(51) Int. Cl.
*H05B 47/125* (2020.01)
*B60Q 1/14* (2006.01)
*H05B 45/10* (2020.01)

(52) U.S. Cl.
CPC ............. *B60Q 1/143* (2013.01); *H05B 45/10* (2020.01); *H05B 47/125* (2020.01); *B60Y 2200/222* (2013.01); *B60Y 2200/412* (2013.01)

(58) Field of Classification Search
CPC ...... B60Q 1/143; H05B 45/10; H05B 47/125; B60Y 2200/222; B60Y 2200/412
See application file for complete search history.

(56) References Cited

U.S. PATENT DOCUMENTS

| 10,195,980 B2 | 2/2019 | Widdowson et al. |
| 10,538,195 B2 | 1/2020 | Fritz et al. |
| (Continued) | | |

FOREIGN PATENT DOCUMENTS

| DE | 19839881 A1 | 3/2000 |
| DE | 202004010944 U1 | 10/2004 |
| (Continued) | | |

OTHER PUBLICATIONS

Demski et al., Implement Recognition Lighting, U.S. Appl. No. 63/017,978, filed Apr. 30, 2020, 88 pages.

(Continued)

*Primary Examiner* — Minh D A
(74) *Attorney, Agent, or Firm* — Taft Stettinius & Hollister LLP; Stephen F. Rost

(57) ABSTRACT

A control system of an off-road work vehicle for performing a work function includes a controller for controlling the work vehicle, a light control module for controlling a lighting system of the work vehicle, and a sensing device disposed in communication with the controller. The lighting system includes a array field light that is operably controllable to project a light emission. The sensing device signals a location to be illuminated by the array field light to the controller, and the light control module operably controls an output of the array field light to direct substantially its entire light emission at the location.

18 Claims, 4 Drawing Sheets

(56) References Cited

U.S. PATENT DOCUMENTS

| | | | | |
|---|---|---|---|---|
| 2013/0286671 | A1* | 10/2013 | Breiner | B60Q 1/143 |
| | | | | 362/464 |
| 2018/0236928 | A1* | 8/2018 | Fritz | B60Q 1/18 |
| 2018/0279539 | A1 | 10/2018 | Wagner | |
| 2019/0003136 | A1* | 1/2019 | Kimura | B60Q 1/24 |
| 2019/0093320 | A1* | 3/2019 | Forcash | G05D 1/0246 |
| 2019/0101641 | A1* | 4/2019 | Hogan | G01S 13/885 |
| 2019/0317217 | A1* | 10/2019 | Day | G01S 17/58 |
| 2019/0392239 | A1* | 12/2019 | Ferrari | G06V 10/141 |
| 2020/0072946 | A1* | 3/2020 | Fisher | H01S 5/183 |
| 2020/0189507 | A1* | 6/2020 | Green | B60Q 1/52 |
| 2020/0399855 | A1* | 12/2020 | Demski | E02F 9/2004 |
| 2021/0131065 | A1* | 5/2021 | Myers | E02F 9/2083 |
| 2021/0131072 | A1* | 5/2021 | Gratton | B60Q 5/005 |

FOREIGN PATENT DOCUMENTS

| | | |
|---|---|---|
| DE | 202013105012 U1 | 11/2014 |
| DE | 102015104928 A1 | 10/2016 |
| DE | 102016124119 A1 | 6/2018 |
| EP | 0757945 A2 | 2/1997 |

OTHER PUBLICATIONS

Schott et al., Method for Communication between Two Utility Vehicles, unpublished U.S. Appl. No. 17/155,722, filed Jan. 22, 2021, 11 pages.

German Search Report issued in application No. 102021204307.0, dated Dec. 1, 2021, 5 pages.

\* cited by examiner

METHOD OF CONTROLLING AN AGRICULTURAL VEHICLE LIGHTING SYSTEM AND SYSTEM THEREOF

RELATED APPLICATIONS

This application claims the benefit of U.S. Provisional Patent Application Ser. No. 63/045,959, filed Jun. 30, 2020, the disclosure of which is hereby incorporated by reference in its entirety.

FIELD OF THE DISCLOSURE

The present disclosure relates to a lighting system of a work vehicle, and in particular, to a method of controlling the lighting system of the work vehicle.

BACKGROUND

Lighting systems on vehicles are well known and perform numerous tasks. In some instances, conventional lighting systems for on-road vehicles may adjust lighting levels on the basis of other vehicles positioned along a similar path. These lighting systems can offer guidance to an operator who is controlling the steering and operation of the vehicle.

In some ways, these conventional lighting systems are being used in off-road vehicles such as agricultural machines, construction or industrial machines, and forestry machines. As technology continues to evolve and is added to these types of machines, additional in-cabin lights and controls are added for operation by the operator. These additional lights and controls can cause an operator to focus more attention on these controls rather than in a field, on an implement, or areas around the machine. The continuous back-and-forth between monitoring the controls and lights within the cab of the machine and the field being operated in can cause fatigue to the operator and possible errors in the field operation.

While operating a vehicle, particularly an off-road vehicle, it can be difficult to see such as at night, during inclement weather, or when it is foggy. A conventional lighting system of a vehicle can often illuminate a surrounding area of the vehicle, but it is otherwise limited.

It is therefore desirable to provide a lighting system of a work vehicle that may be controlled automatically or manually to draw attention to a given location on the vehicle or a work area.

SUMMARY

In one embodiment of the present disclosure, an agricultural work vehicle assembly for operating in a field includes a work vehicle comprising a controller for controlling operation of the work vehicle and a lighting system, the lighting system comprising a array field light configured to project a light emission; a light control module disposed in electrical communication with the controller, the light control module configured to operably control the output of the array field light; an implement coupled to the work vehicle, the implement including a plurality of units each configured to perform a work function in the field; and a sensing device disposed in communication with the controller; wherein, upon detecting an error with a first unit of the plurality of units, the sensing device transmits a signal indicative of the error to the controller; wherein, the light control module controllably adjusts an output of the array field light so that it directs its light emission at the first unit.

In another embodiment of the present disclosure, a work vehicle for performing a work function includes a chassis; a cab mounted to the chassis, the cab including a work space for an operator to control the work vehicle; a controller for controlling the work vehicle; a work tool operably controlled by the controller for performing the work function; a light control module for controlling a lighting system of the work vehicle, the lighting system including a array field light; and a sensing device disposed in communication with the controller, the sensing device configured to detect a work zone in which the work tool performs the work function; wherein, the array field light is operably controllable to project a light emission; wherein, the sensing device communicates a location of the work zone to the controller; further wherein, the light control module operably controls an output from the array field light to project the light emission to illuminate the work zone.

In a further embodiment, a control system of an off-road work vehicle for performing a work function includes a controller for controlling the work vehicle; a light control module for controlling a lighting system of the work vehicle, the lighting system including a array field light; and a sensing device disposed in communication with the controller; wherein, the array field light is operably controllable to project a light emission; wherein, the sensing device signals a location to be illuminated by the array field light to the controller; further wherein, the light control module operably controls an output of the array field light to direct substantially its entire light emission at the location.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
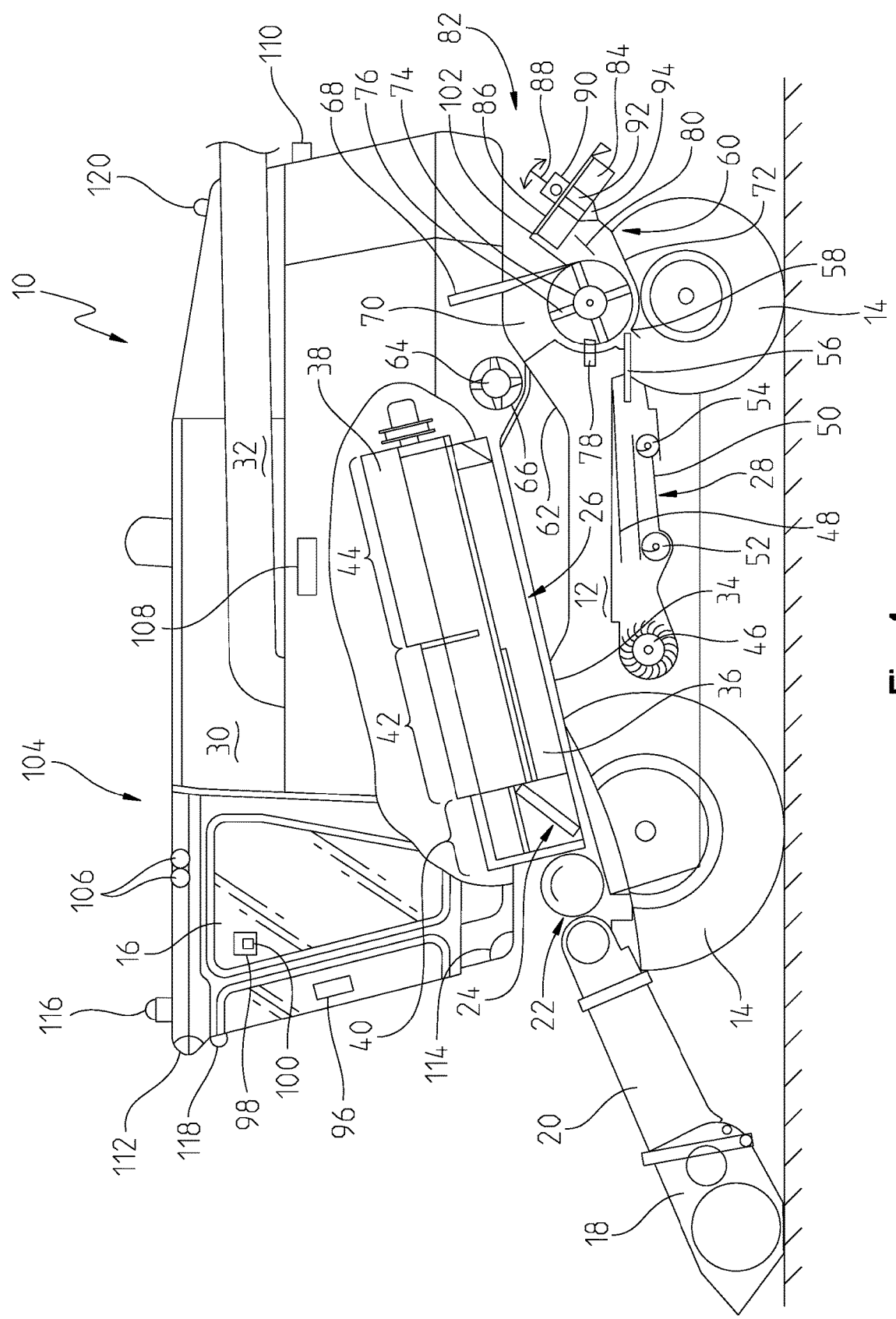
FIG. 1 is a partial section of a side view of an agricultural vehicle with a lighting system according to the present disclosure.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In FIG. 1, an illustrative example is provided of a work machine. In this example, the work machine is depicted as an agricultural vehicle, and in particular, to an agricultural combine 10. The present disclosure, however, is not limited to a combine or any other agricultural vehicle. The work machine or vehicle may be any type of agricultural, construction, forestry, industrial, or off-road machine or vehicle. Moreover, the terms "machine" and "vehicle" are used interchangeably in this disclosure to refer to the same thing.

In the embodiment of FIG. 1, an agricultural combine 10 is shown with a chassis 12 with wheels 14 in contact with the ground. Wheels 14 are coupled to the chassis 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls including an operator terminal or controls 96 for controlling the operation of the combine 10. A cutter head 18 may form part of an implement attached to the combine 10. Alternatively, the cutter head 18 may form part of the combine and thus is mounted to the chassis 12. In any event, the cutter head 18 may be disposed at a forward end of the combine 10 and is used in order to harvest crop such as corn and to conduct it to a slope conveyor 20. The harvested crop is conducted by a guide drum 22 to a slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Corn and chaff that fall through a thresher basket associated with the threshing section 42 and through a separating grate associated with the separating section 44 may be directed to a cleaning system 28 with a blower 46 and sieves 48, 50 with louvers. The sieves 48, 50 can be oscillated in a fore-and-aft direction. The cleaning system 28 removes the chaff and guides the clean corn over a screw conveyor 52 to an elevator for clean corn (not shown). The elevator for clean corn deposits the clean corn in a corn tank 30, as shown in FIG. 1. The clean corn in the corn tank 30 can be unloaded by an unloading screw conveyor 32 to a corn wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48 that consist essentially of chaff and small straw particles may be conveyed by an oscillating sheet conveyor 56 to the rear and to a lower inlet 58 of a chopper rotor assembly 60.

The aforementioned blower 46 produces an air flow that carries much of the chaff and small particles to the rear of the combine and to the chopper rotor assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and MOG is directed through the cleaning system 28. A wall 68 is located to the rear of the ejection drum 64. The wall 68 guides the straw into an upper inlet 70 of the chopper rotor assembly 60.

The chopper rotor assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the chopper rotor assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the chopper rotor assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

In FIG. 1, the agricultural vehicle 10 may include a lighting module or system 104 which is an integral part of the vehicle. The lighting module or system 104 may utilize a high-definition (HD) pixel or pixel light-emitting diode (LED) light array module. The system 104 may include its own control module 224 (see FIG. 2). The light system control module or controller 224 may be operably disposed in electrical communication with a vehicle controller 222, which controls the operation of the vehicle 10. The vehicle controller 222 may send communications or signals to the control module 224 for controlling the lighting system 104.

With matrix lighting, a vehicle controller may use a high beam and a low beam to illuminate the vehicle surroundings. With matrix lighting control, the controller may turn off the high beam and create a darkened column in the area where an oncoming vehicle or object is so as to not blind the vehicle (or person). With HD LED or HD Pixel source LED illumination, pixel technology is utilized in which more focused areas can be illuminated or de-illuminated based on need. Rather than using a single bulb, for example, the lighting system of the present disclosure may control individual pixels or pixel segments to project or illuminate. Individual segments may include between a thousand to over a million pixels, and the lighting system controller or control module 224 may operably enable or disable individual segments during operation. Moreover, the control module 224 may vary the intensity of the individual segments to project information or other communications onto the field.

The lighting system may be formed by an ambient or working lighting of the vehicle or an illumination provided inside the cab 16 in the form of illuminatable control and display elements or interior lighting. The working lighting may include a plurality of field lights mounted to the vehicle at different locations. In one example, each of the plurality of field lights may comprise a LED array field light. Other technology besides LED may be used for the field lights. The plurality of field lights may include a first field light 106, a second field light 108, a third field light 110, a fourth field light 112, and a fifth field light 114. In other embodiments, there may be additional or fewer field lights. In other words, there can be any number of field lights mounted to the chassis 12, cab 16, cutter head 18, etc. In the illustrated example of FIG. 1, the first field light 106 may be mounted to a roof of the cab 16. The second field light 108 may be mounted to each side or only one side of the vehicle 10. The third field light 110 may be mounted to the rear of the chassis 12. The fourth field light 112 may be mounted to a front portion of the roof of the cab 16, and the fifth field light 114 may be mounted to a front deflector or portion of the chassis 12 below the cab 16. The location of each field light may differ on other vehicles or machines, and thus the example of FIG. 1 is only intended to illustrate an example of one lighting system 104.

The plurality of field lights may enable an aerial or overlapping illumination of a terrain or field surface surrounding the agricultural vehicle 10. One or more of the field lights can be activated individually and varied in terms of their luminous intensity by the vehicle controller 222 for adapting the emission characteristic or light intensity.

In addition to the actual lamp (Halogen or gas discharge lamp, LEDs or the like), one or more of the plurality of field lights may have optical devices for changing the emission characteristic, and consequently, the emission angle or the emission angle-dependent light distribution. The optical devices can be formed either by electrically controllable optical systems (collimators or lens systems), or else by the lamp itself. In the latter case, this may include a segmented LED matrix, in which individual matrix segments can be switched on and off and varied in their luminosity by the controller 222.

Inside the cab 16 may include a camera 100 for optically detecting the position or head posture of a vehicle operator. The information obtained by the camera 100 may be fed to the controller 222 to determine the instantaneous viewing direction of the vehicle operator using image processing software. The camera 100 may be integrated in a rear-view mirror or a housing 98, for example, covered by the rear-view mirror.

Figure 2:
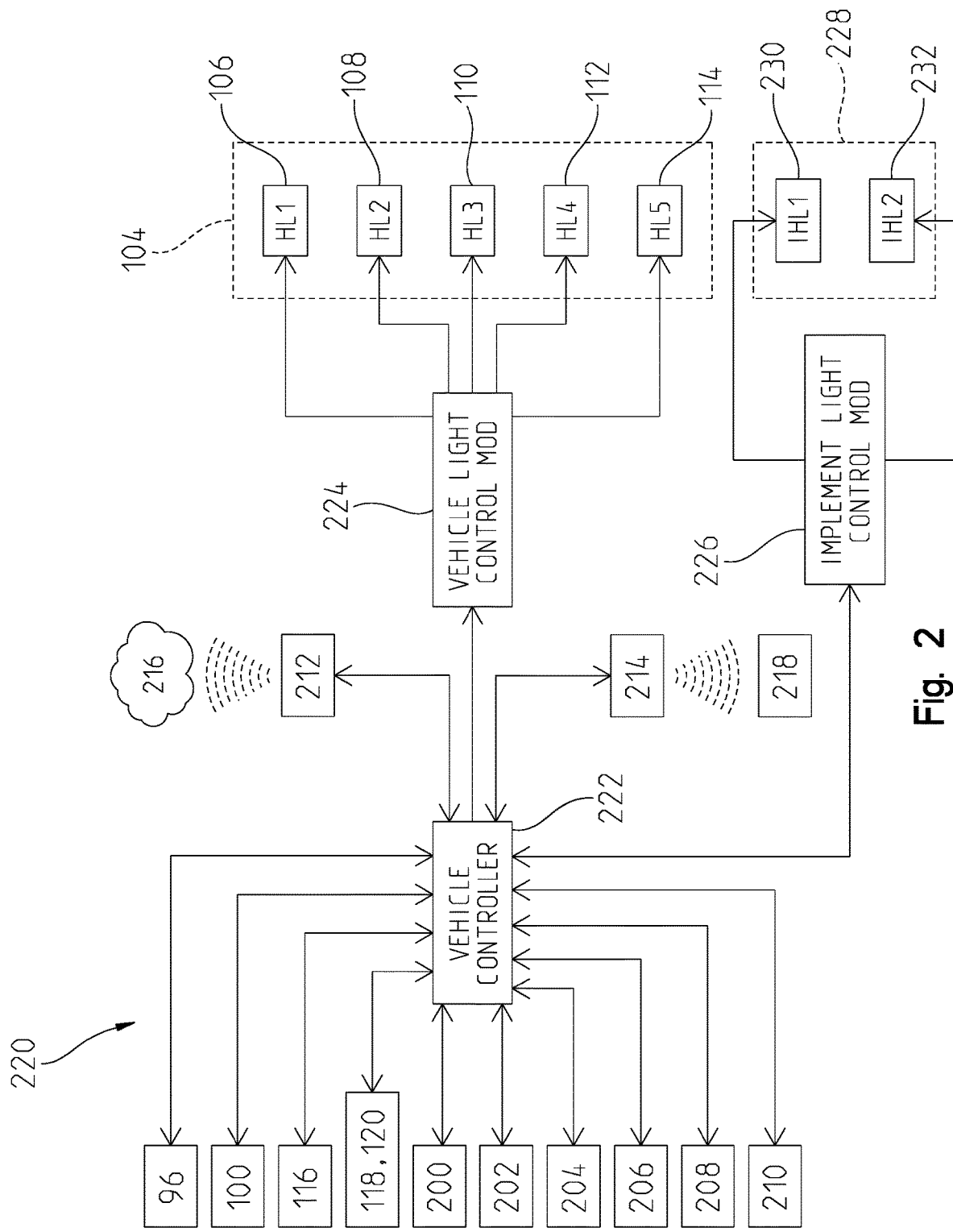
FIG. 2 is a schematic of a control system of the vehicle and lighting system of FIG. 1.

As shown in FIG. 2, the vehicle controller 222 may form part of a vehicle control system 220. Here, the controller 222 may include a data interface 212 for the wireless reception of position or other information broadcast by another work machine or vehicle (not shown). The position information broadcast by the other vehicle may be located in a data cloud 216 and can be retrieved from there via the data interface 212 using an existing wireless network.

On the basis of the position information received, the controller 222 can determine a relative position of the agricultural vehicle 10 with respect to another vehicle or an implement, for which purpose the controller 222 performs a comparison with position information in relation to the vehicle 10. The assessment or determination of the relative position may be carried out on the basis of a polar coordinate system, in which the vehicle 10 forms the origin of the coordinate system.

The position information related to the vehicle 10 may be captured by a satellite-based navigation system. The satellite-based navigation system can be either installed in the vehicle 10 or else implemented as a wireless device 218. The latter may be a component part of a mobile telephone of the vehicle operator, wherein the calculated position information is transmitted wirelessly to the controller 222 via an LTE connection established by a wireless interface 214.

In addition, in order to determine potential extraneous light effects, the controller 222 may be connected to an ambient-sensing light or image sensor. The light or image sensor may be a panorama or 360-degree camera 116 arranged in the roof area of the cab 16. Alternatively, it can also be light-sensitive sensor elements or individual cameras (not shown), distributed along an outer side of the vehicle 10.

Besides the lighting system 104 and cameras, the agricultural vehicle 10 may include one or more sensors for detecting a relative position of the vehicle to another object. For example, a first proximity sensor 118 may be mounted to the front side of the vehicle 10 and a second proximity sensor 120 may be mounted to the rear side thereof. Each sensor may be in electrical communication with the controller 222, as shown in FIG. 2. The first sensor 118 may detect an object in front of the vehicle as it travels in a forward direction, whereas the second sensor 120 may detect an object either approaching from behind or an object in the path of rearward movement of the vehicle 10. The vehicle 10 may include additional sensors for detecting the position of the vehicle relative to surrounding objects and provide corresponding feedback to the controller 222.

The controller 222 may be in a position where it receives data and other feedback from the operator of the vehicle along with sensors, cameras, remote devices, and the like across the vehicle and implement. In the example of FIG. 2, the controller 222 may be arranged to receive a plurality of inputs. For instance, the controller may receive communication from the operator terminal 96 in the form of commands or instructions from the operator. This may include instructions to accelerate, decelerate, or turn the tractor. Alternatively, this may include to active or de-activate the lighting system 104. Further, it may include commands to operate the vehicle according to a desired mode or setting. Other known operator commands may be communicated to the controller 222 via the operator terminal 96.

The controller 222 may also receive images or other communications from the camera 100 located in the cab 16 of the vehicle. The camera may detect movement of the operator and communicate the same to the controller 222. While a camera is depicted in FIG. 1, the camera 100 may also comprise a sensor for detecting a characteristic of the vehicle from inside the cab 16.

The controller 222 may further receive communication from the camera 116 located externally of the cab 16. Here, the camera 116 may detect environmental conditions such as dusk or dawn, lighting effects from the lighting system 104, along with a view of the area around the work vehicle 10. This may include objects or obstacles in a field, a fence line, a roadway, or other on-road or off-road vehicles in the general area. Further, the camera 116 may detect an implement being towed by the work machine and communicating this to the controller 222. In one example, the camera 116 may provide images to the controller 222, which in turn may communicate these images to the operator as will be described further below.

The controller 222 may be in communication with the first and second proximity sensors 118, 120. The sensors may communicate objects that are within a predefined distance of the vehicle 10. This may include other vehicles or an implement being towed by the work vehicle in the field, or on a roadway during transport.

As shown in FIG. 2, the controller 222 may receive communications from one or more sensors 200 regarding an operating status, operating position, or diagnostic trouble codes (DTCs) related to the vehicle. These sensors 200 may communicate warnings in the form of DTCs to the operator such as, but not limited to, low battery level, low fuel, etc.

The controller 222 may receive communications from a field map input 202 which may include positional information relative to a field. This information may be determined and loaded into a memory unit of the controller 222, or it may be communicated from a remote source. The information from the field map input 202 may include field boundaries, roadways, fence lines, obstacles to avoid, etc. This information may be provided to the controller 222, which can then provide this information to the operator during field operation.

The controller 222 may also be in communication with a global positioning sensor (GPS) input 204. The GPS input 204 may come from a satellite or other remote sensing device (e.g., a cell phone). The GPS input 204 may provide a location of the vehicle 10 to the operator so that the operator is able to determine where in the field the vehicle is located.

A vehicle speed input 206 may provide vehicle speed to the controller 222. An operation mode type input 208 may provide the operator with details related to what type of operating mode a towed implement or the cutter head 18 is in. For an agricultural sprayer, for example, the operation mode type input 208 may signal when a sprayer boom of the sprayer is folded, which is indicative of a transport mode, or unfolded, which is indicative of a field or working mode.

Other sensors 210 may be in communication with the controller 222 to provide performance data or information about the vehicle or implement. This performance data or information may include any data that is generally collected, monitored, displayed, calculated, etc. and provided to the operator to better control the operation of the vehicle or implement.

As shown in FIG. 2, the work vehicle 10 may be capable of towing an implement. For instance, the work vehicle may be a tractor which tows a mowing, planting or spraying implement. In any event, the implement may include its own lighting system. The implement lighting system may be operably controlled by the vehicle controller 222 in the same way as the vehicle lighting system 104. In another embodiment, the implement lighting system may be operably controlled via the vehicle light control module 224.

In yet another embodiment, which is shown in FIG. 2, the implement lighting system may include its own implement light control module 226 for operably controlling the implement lighting system. Here, the implement lighting system 228 may include a first implement array field light 230 and a second array implement field light 232. The implement lighting system 228 may include one or more array field lights for projecting a light emission externally from the implement to illuminate areas around the implement.

As described above, conventional lighting systems were controlled to either be turned completely on or off. If a high beam and low beam were available, then a high beam may be used to further illuminate the surrounding environment compared to the low beam. When an oncoming vehicle is detected, the high beam may be switched to the low beam. In doing so, the operator of the oncoming vehicle is not blinded by the light emission of the high beam.

In this disclosure, the light control module 224 of the vehicle and/or the implement light control module 226 may receive communications from the controller 222 and operably control individual pixel segments to project or display light emissions from each of its individual array field lights. Each array field light may be operably controlled independently of the other field lights such that at any given time one or more of the LED field lights may be operably controlled on or off. As a result, if an object or boundary is detected, individual pixel segments may be disabled without completing shutting off the entire field light. This can provide advantages such that the surrounding environment may still be illuminated by the lighting system, but the intensity of individual pixels or pixel segments may be adjusted based on what is detected by the control system. The ability to control the lighting system of the vehicle and implement via matrix lighting technology, along with camera and/or sensor technology to detect the presence of an oncoming vehicle and the like, provides additional benefits over conventional lighting systems.

To achieve the aforementioned benefits, the present disclosure provides a high-definition pixel and/or pixel LED lighting system to expand the overall coverage zone of illumination around the work vehicle and implement. This lighting system may improve the visibility of the work vehicle and implement to the operator and to others in or near the coverage zone, particularly as more work vehicles are operating later at night. The lighting system may be operably controlled via control system to that shown in FIG. 2 where individual array field lights may be selectively controlled to modify the light emission therefrom.

In one example of this disclosure, a fast strobe sequence of all array field lights may be implemented to help illuminate the work vehicle so that another vehicle in the field or otherwise may clearly see the work vehicle. The fast strobe sequence may utilize a rotation of a field light, flashing, or any other type of lighting sequence.

In a further example, a lighting system of a work vehicle may be interfaced with a lighting system on a towed implement. For instance, a tractor may be pulling a planter through a field such that the tractor lighting system and planter lighting system project light emissions from each array field light to illuminate the field in which they are operating. In this example, the vehicle controller may operably control the planter lighting system to illuminate the field and then operably control the tractor lighting system to illuminate those zones or areas not illuminated by the planter lighting system. The use of matrix lighting may be implemented where individual pixel segments of each array field light may be controlled on to fill in the gaps left by the planter lighting system. The same may be true with using the planter lighting system to fill in gaps not illuminated by the tractor lighting system.

Figure 3:
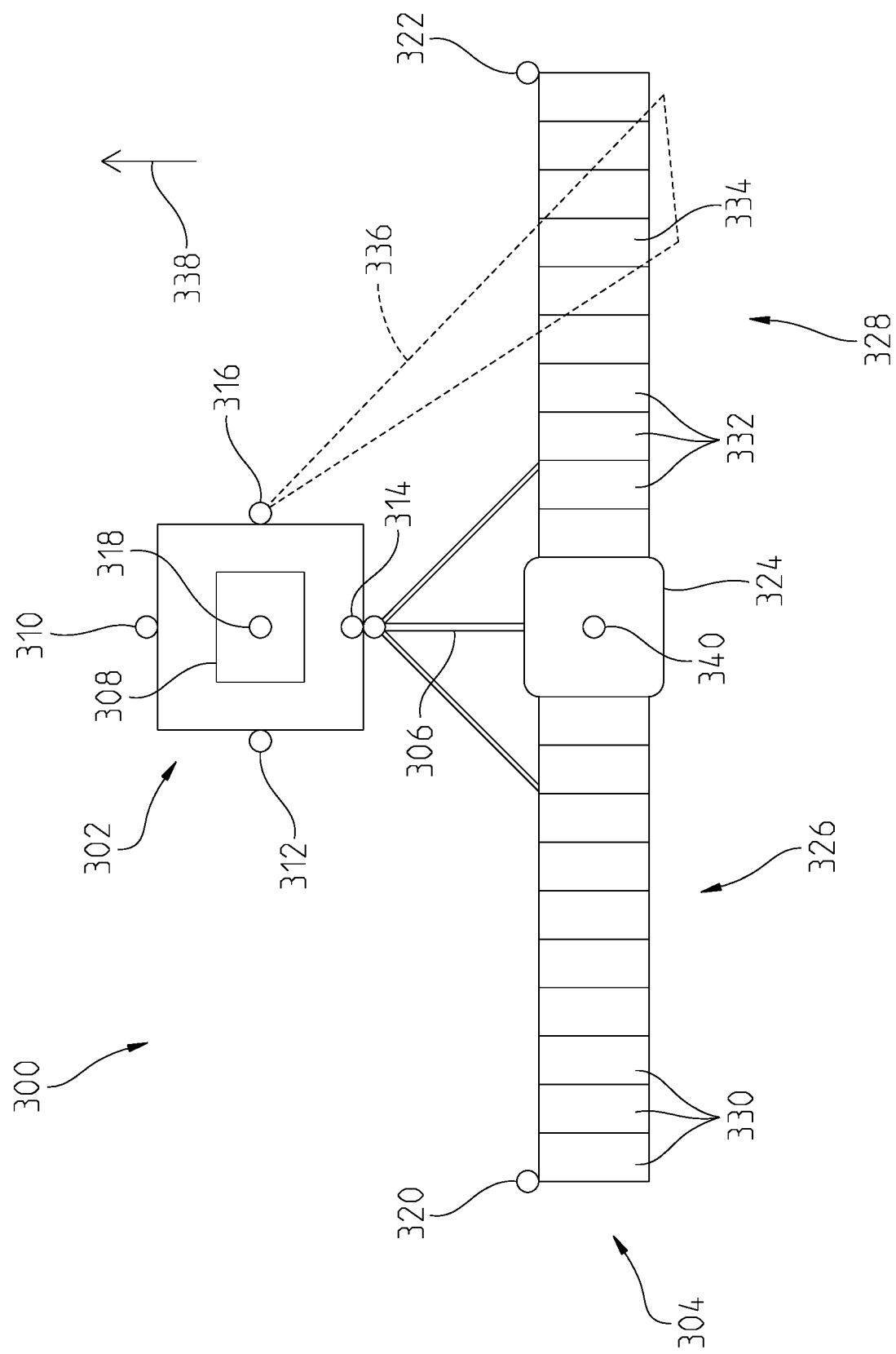
FIG. 3 is a schematic of a combined work vehicle and implement with a lighting system.

Referring to FIG. 3, a combination 300 of a work vehicle and implement is shown. In particular, the work vehicle is shown in the form of a tractor 302. While a tractor 302 is depicted, the work vehicle may include any off-road work vehicle in the agricultural, construction, or forestry industries. Further, off-road work vehicles outside of these industries may also be applicable for the sake of this disclosure. The tractor 302 may include a chassis or frame to which a cab 308 is mounted. An operator may be positioned within the cab 308 for controlling the operation of the tractor 302 via one or more controls or operator inputs 96. The chassis may be supported on a ground (e.g., a field or roadway) via a plurality of wheels (not shown).

An implement 304 in the form of a planter is also illustrated in FIG. 3. Here, the implement 304 may be coupled to the tractor 302 by a drawbar 306. A hitch or other connecting device may also be used for coupling the tractor 302 and implement 304 to one another. The planter 304 may include a container or hopper 324 for holding seed, fertilizer, etc. The planter 304 may be an air seeder in one example such that pneumatic lines may be routed to each end of the planter 304. In any event, the planter 304 may include a first end or side 326 and a second end or side 328. The first end 326 may include a plurality of individual row units 330 and the second end 328 may include a plurality of row units 332. The specifics of each row unit is not described herein, but may include the structure and functionality of any conventional row unit.

In this embodiment, the tractor 302 may include a lighting system similar to that described above with reference to FIGS. 1 and 2. In particular, the lighting system may be a high-definition pixel and/or pixel LED lighting system. The lighting system, for example, may include a plurality of array field lights. In FIG. 3, for example, the plurality of array field lights may include a first array field light 310, a second array field light 312, a third array field light 314, and a fourth array field light 316. The first array field light 310 may be positioned on a front end of the tractor 302. In use, the first array field light 310 may project a light illumination in a forward direction 338 so that an operator may visualize objects and the field in front of the tractor 302. The second array field light 312 may be positioned on one side of the tractor 302, while the fourth array field light 316 may be positioned on the opposite side thereof. The third array field light 314 may be positioned on a rear end of the tractor 302. Additional array field lights may also form part of the lighting system such as including one or more array field lights positioned on the cab 308 or chassis. The plurality of array field lights are configured to illuminate the entire surrounding area or environment of the tractor 302 to allow the operator to better visualize the field and any objects therein.

The tractor 302 may also include a sensing device 318. The sensing device 318 may include a sensor such as a proximity sensor. Alternatively, the sensing device 318 may include a light such as a array field light. Moreover, the sensing device 318 may include a camera capable of taking images or video and transmitting those to a display in the cab 308 for the operator to see. In another example, the sensing device 318 may include a transmitter for transmitting signals or a receiver capable of receiving signals. These signals may come from the controller 222 or be communicated thereto. In yet a further example, the sensing device 318 may include a combination of two or more of a sensor, light, camera, receiver and transmitter.

The implement 304 may also include a lighting system similar to that of the tractor 302. The implement lighting system may include a first implement array field light 320 disposed at the first end 326 and a second implement array field light 322 disposed at the second end 328. Additional array field lights may be provided on the implement 304 for illuminating the surrounding area.

The implement 304 may also include a sensing device 340. The sensing device 340 may include a sensor such as a proximity sensor. Alternatively, the sensing device 340 may include a light such as a array field light. Moreover, the sensing device 340 may include a camera capable of taking images or video and transmitting those to a display in the cab 308 for the operator to see. In another example, the sensing device 340 may include a transmitter for transmitting signals or a receiver capable of receiving signals. These signals may come from the controller 222 or implement light control module 226, or be communicated thereto. In yet a further example, the sensing device 340 may include a combination of two or more of a sensor, light, camera, receiver and transmitter.

During operation, the tractor 302 and implement 304 may be traveling in the forward direction 338 performing a work function (e.g., planting). During the operation, an issue or problem may arise with one of the row units on the implement 304. In this example, a problem may arise with a first row unit 334 in FIG. 3. The first row unit 334 may be plugged or not functioning properly, and this may be detected by the sensing device 318 on the tractor 302, the sensing device 340 on the implement 304, or any other sensing device including the controller 222. A diagnostic trouble code (DTC) may be triggered by a sensor 200, for example, of the control system 220 and communicated to the controller 222. Upon detecting the DTC, the controller 222 may determine which row unit is having the issue. This may be communicated to the controller 222 by the sensor 200, or either sensing device 318, 340 may communicate this to the controller 222.

Once the controller 222 determines the first row unit 334 is having a problem, the controller 222 may operably communicate this to the light control module 224. At night or when it is otherwise difficult to identify which row unit actually has the problem due to poor lighting, the vehicle lighting system may be used to assist the operator or other personnel locate the issue. Here, the light control module 224, which is part of the vehicle lighting system, may utilize HD pixel and/or pixel LED lighting in combination with matrix work lighting in order to draw attention to the given work area to more quickly allow the operator to identify the problem or issue with the first row unit 334. To do so, the light control module 224 may operably control the output of the fourth array field light 316, for example, to project a focused light emission 336 directed at the first row unit 334.

In one example, logic executable by the controller 222 or light control module 224 may determine the precise location of the implement 304 relative to the tractor 302 and each array field light, and then operably controlling the respective array field light (i.e., the fourth array field light 316 in this example) to enable pixelated light in the work area of the first row unit 334. The row units adjacent to or near the first row unit 334 may also be partially illuminated, but the light control module 224 may control the output of the plurality of array field lights so that a focused, higher intensity illumination of the first row unit 334 is achieved compared to other row units. This enables the operator or other personnel to quickly identify the location of the problem, and also possibly resolve the issue due to the lighting.

In a further example, the implement 304 is capable of detecting the problem with the first row unit 334. The implement 304 may include its own controller, or its sensing device 340 may detect the error with the first row unit 334. As it does, the implement controller or sensing device 340 may be in communication with the controller 222 via a communication bus or link. As the controller 222 receives the communication regarding the error or problem, it is able to identify the row unit having the problem and command the light control module 224 to enable pixelated light in the work area of the first row unit 334. In this instance, the implement lighting system may be disabled or otherwise controlled to allow the operator or other personnel to identify the first row unit 334 among the plurality of row units, diagnose the error, and if possible repair the problem.

Figure 4:
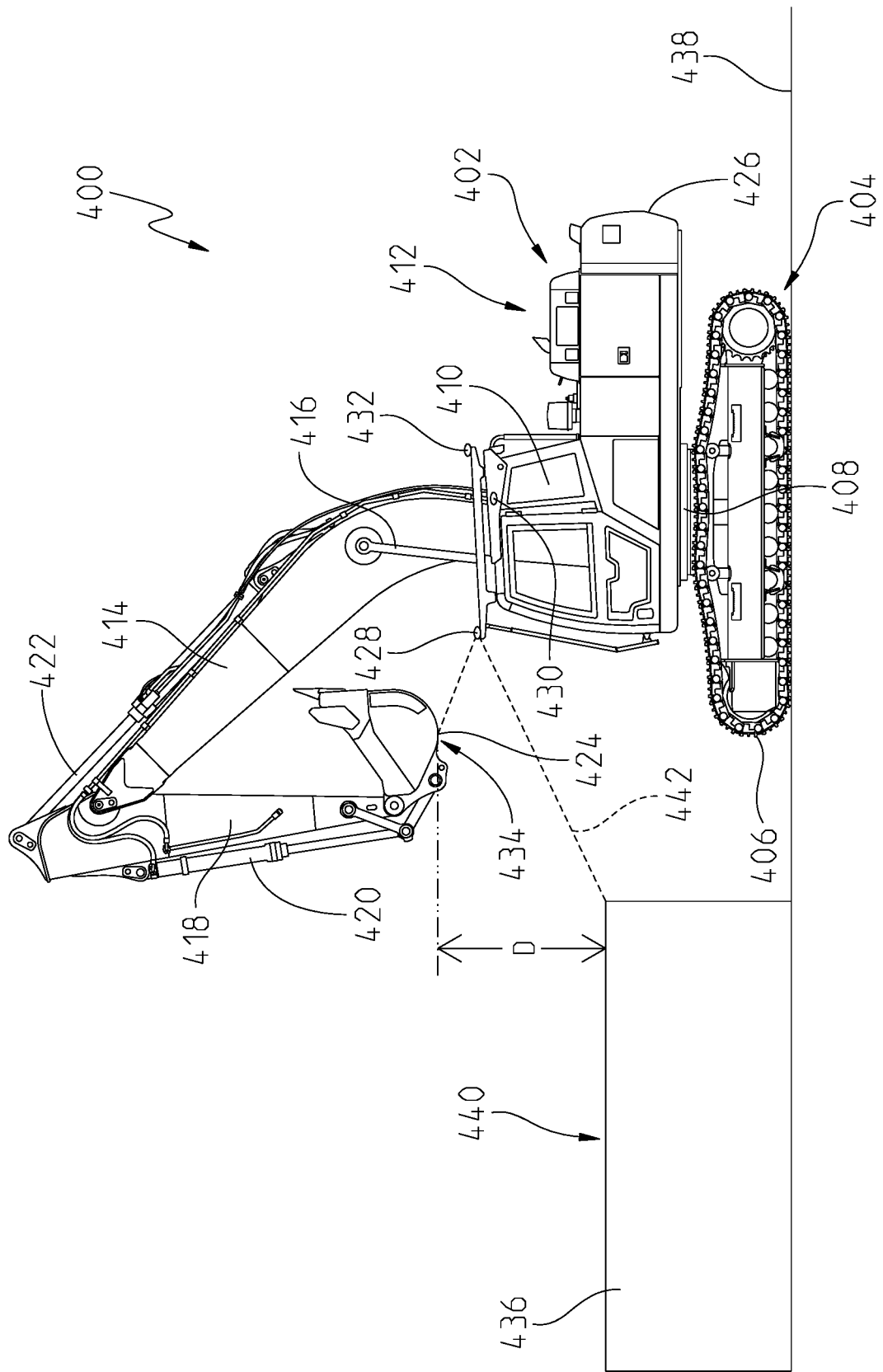
FIG. 4 is a schematic of a work vehicle with a lighting system for highlighting a work area.

Referring now to FIG. 4, another embodiment of a work machine is shown in FIG. 1. The machine is embodied as an excavator 100. The present disclosure is not limited, however, to an excavator and may extend to other work machines such as those in the agricultural, construction and forestry industries. Referring to FIG. 4, the excavator 400 includes an upper frame 402 pivotally mounted to an undercarriage 404. The upper frame 402 can be pivotally mounted on the undercarriage 404 by a swing pivot 408. The upper frame 402 is rotatable 360° relative to the undercarriage 404 about the swing pivot 408. A hydraulic motor (not shown) can drive a gear train (not shown) for pivoting the upper frame 402 about the swing pivot 408.

The undercarriage 404 can include a pair of ground-engaging tracks 406 on opposite sides of the undercarriage 404 for moving along the ground. Alternatively, the excavator 400 can include wheels for engaging the ground. The upper frame 402 includes a cab 410 in which the machine operator controls the machine. The cab 410 can include a control system (not shown) including, but not limited to, a steering wheel, a control level, control pedals, or control buttons. The operator can actuate one or more controls of the control system for purposes of operating the excavator 400.

The excavator 400 also includes a large boom 414 that extends from the upper frame 402 adjacent to the cab 410. The boom 414 is rotatable about a vertical arc by actuation of a pair of boom cylinders 416. A dipper stick or arm 418 is rotatably mounted at one end of the boom 414 and its position is controlled by a cylinder 422. The opposite end of the boom 414 is coupled to the upper frame 402. At the end opposite the boom 414, the dipper stick or arm 418 is mounted to an excavator bucket 424 that is pivotable relative to the arm 418 by means of a cylinder 420. Cylinders 416, 420, and 422 can be electric or hydraulic cylinders.

The upper frame 402 of the excavator 400 includes an outer shell cover to protect an engine assembly 412. At an end opposite the cab 410, the upper frame 402 includes a counterweight body 426. The counterweight 426 comprises a housing filled with material to add weight to the machine and offset a load collected in the bucket 424. The offset weight can improve the digging performance of the excavator 400.

The work vehicle 400 of FIG. 4 may include a pixelated lighting system similar to that described in FIGS. 1-3. The lighting system may be a high-definition pixel and/or pixel LED lighting system. The lighting system, for example, may include a plurality of array field lights. In FIG. 4, the plurality of array field lights may include a first array field light 428, a second array field light 430, and a third array field light 432. The first array field light 428 may be located on a front or forward end of the work vehicle 400. As shown, it is coupled to a forward portion of the roof of the cab 410. Each of the plurality of array field lights may be configured to illuminate different zones or areas around the work vehicle 400.

A challenge associated with work vehicles such as the excavator 400 of FIG. 4 is when using the bucket 424 to dump or take material from a container 436, the conventional lighting system of the work vehicle can often reflect on a rear portion of the bucket 424. As it does, the reflection or glare of the light off the bucket 424 can often blind or at least partially blur the vision of the operator trying to control the bucket 424 to perform a work function (e.g., dumping, digging, etc.). This can often make it difficult for the operator to perform the work function. At night when the lights are illuminating the work space, the operator may have to shut off the conventional lighting system in order to reduce or eliminate the reflecting light. This, of course, is undesirable at night when there is less light in the work area.

In order to overcome the challenges here, the lighting system of the work vehicle 400 may be controlled in order to readjust the light emissions being projected from the lighting system such that the light emission is projected in the area between the bucket 424 and the container 436 without producing the undesirable glare. This is shown in FIG. 4 where the work vehicle 400 is performing a work function with respect to the container 436. The container 436 may be a commercial dumpster, a trailer bed, or other similar device disposed on a ground surface 438. The container 436 may include an opening 440 in its top in which the bucket 424 may deposit material into.

In this embodiment, the bucket 424 may include a lower surface or portion 434 as shown. As the operator controls the work machine 400 to perform the work function of dumping material into the container 436, the controller 222 may receive signals from a sensing device (not shown) on the work machine. The sensing device may be similar to the camera/sensor 318 of FIG. 3. Here, the sensing device may be a proximity sensor configured to detect a location of the lower surface 434 relative to the first array field light 428. The same sensing device or a different sensing device may be configured to detect a location of the opening 440 of the container 436 relative to the first array field light 428. In a similar embodiment, the sensing device may be configured to detect the location of the lower surface 434 and opening 440 relative to each of the plurality of array field lights on the work machine, and communicate these locations to the controller 222.

In an alternative embodiment, the sensing device may be a camera capable of detecting the location of the lower surface 434 and opening 440 and providing information to the controller 222 in regards to the location of both. A distance, D, may separate the lower surface 434 from the opening 440. This distance may be defined as a work zone. The work zone may change as the bucket 424 moves towards or away from the opening 440. Further, the work zone may further be defined as the area between the lower surface 434 and opening 440 relative to the first array field light 428.

As the controller 222 determines the work zone, i.e., the area or distance between the lower surface 434 and opening 440 relative to the first array field light 428 (or any other array field light), the controller 222 may operably communicate the work zone to the light control module 224. In response, the light control module 224 may operably control an output of the first array field light and/or any other array field light to project a light emission 442 therefrom to focus on work zone. This is shown in FIG. 4 where the light emission from the first array field light is prescribed to only illuminate the area between the lower surface 434 of the bucket 424 and the opening 440 in the container 436. As this happens, the rear portion of the bucket 424 is not illuminated, and therefore a reflecting light or glare is avoided. Moreover, the operator positioned in the cab 410 is clearly able to visualize the work zone and identify the distance, D, between the bucket 424 and the opening 440. This is particularly useful at night and when the external conditions make it otherwise difficult to see.

Control logic in the controller 222 or light control module 224 may be executed to prescribe only those pixels or pixel segments are active to illuminate the work zone. The control logic may include details regarding the shape of the work vehicle 400 or bucket 424, the size of opening, etc.

While the aforementioned embodiment describes the focus of the light emission being on the lower surface 434 of the bucket 424, it is to be understood that any location on the bucket 424 may be used for defining the work zone. The sensing device may be programmed to detect a specific location on the bucket 424 and communicate this to the controller 222.

In at least one embodiment, the controller 222 and light control module 224 may be the same controller. As such, communications from the camera or sensing device may be sent to the same controller which in turn operably controls the lighting system of the work vehicle.

The principles described and shown with respect to FIG. 4 may be implemented in other aspects. An operator of a front loader may benefit from the focused lighting as it relates to the use of the bucket on the front loader. Similarly, a dump truck operator may benefit by the focused lighting from the lighting system as it determines where to dump a load of material. Other work vehicles may incorporate the teachings of this embodiment to improve the lighting of a work zone as a work vehicle performs a work function or operation.

In another example, the light control module 224 may adjust the light intensity such as dimming the individual lights or increasing the luminosity, particularly if using white lights or using the white color spectrum.

In this disclosure, LED technology is covered but is not intended to be limiting. Other lighting technologies may be used as well including laser, DLP, a combination of LED and other, etc. Each light may be an array field light or light source.

In this disclosure, a plurality of sensing device technologies are described including proximity sensors and camera-based technology. Other sensing technologies such as LIDAR, infrared, radar, etc. may also be used.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. An agricultural work vehicle assembly for operating in a work area, comprising:
an agricultural work vehicle comprising a controller for controlling operation of the agricultural work vehicle and a lighting system, the lighting system comprising an array field light configured to project a light emission to illuminate an agricultural work implement;
a light control module disposed in electrical communication with the controller, the light control module configured to operably control the output of the array field light;
the agricultural work implement coupled to and towed by the agricultural work vehicle, the agricultural work implement including a plurality of row units configured to distribute seed, fertilizer, or both to the work area;
a sensing device comprising a camera disposed in communication with the controller, wherein the sensing device comprising the camera is configured to detect an issue with a first row unit of the plurality of units that prevents the first row unit from functioning properly;
wherein, upon detecting the issue with the first row unit of the plurality of units, the sensing device transmits a signal indicative of the issue to the controller;
wherein, the light control module controllably adjusts the light emission of the array field light so that the array field light directs the light emission at the first row unit of the agricultural work implement to improve visibility of the first row unit of the agricultural work implement.

2. The assembly of claim 1, wherein the light emission of the array field light illuminates only the first row unit.

3. The assembly of claim 1, wherein the array field light comprises a high-definition pixel LED lighting module.

4. The assembly of claim 1, wherein the sensing device comprises a camera, a proximity sensor, a light, or a combination thereof.

5. The assembly of claim 1, wherein the sensing device is located on the agricultural work vehicle.

6. The assembly of claim 1, wherein the sensing device is located on the agricultural work implement.

7. The assembly of claim 1, wherein the lighting system comprises a second array field light configured to project a light emission, the light control module controllably adjusting a light emission of the second array field light so that it directs its light emission at the first row unit.

8. The assembly of claim 1, wherein the lighting system comprises a plurality of array field lights each of which is configured to project a light emission, the light control module controllably adjusting a light emission of each of the plurality of array field lights so that each directs its light emission at the first row unit.

9. The assembly of claim 1, wherein the agricultural work implement comprises:
a work implement lighting system including a work implement array field light coupled to the agricultural work implement;
a work implement light control module operably controlling a light emission from the work implement array field light;
further wherein, the work implement light control module controllably adjusts the light emission of the work implement array field light so that it directs its light emission at the first row unit.

10. The assembly of claim 1, wherein the agricultural work implement comprises:
a work implement lighting system including a work implement array field light coupled to the work implement;
a work implement light control module operably controlling a light emission from the work implement array field light;
further wherein, when the work implement light control module controllably adjusts the light emission of the work implement array field light so that it directs its light emission at the first row unit, the work implement light control module controllably disables the work implement array field light.

11. The assembly of claim 10, wherein the lighting system comprises a second array field light configured to project a light emission;
further wherein, when the work implement light control module controllably adjusts the output of the first mentioned array field light so that it directs its light emission at the first unit, the work implement light control module controllably disables an output of the second array field light.

12. A work vehicle for performing a work function at a field surface or at a roadway, comprising:
   a chassis;
   a cab mounted to the chassis, the cab including a work space for an operator to control the work vehicle;
   a controller for controlling the work vehicle;
   a work tool connected to the chassis and operably controlled by the controller for performing the work function;
   a light control module for controlling a lighting system of the work vehicle, the lighting system including an array field light, wherein the array field light includes individual pixels or pixel segments;
   a sensing device comprising a camera disposed in communication with the controller, the sensing device configured to detect a work zone at the field surface or at the roadway in which the work tool performs the work function;
   wherein, the array field light is operably controllable to enable or disable a light emission from individual pixels or individual pixel segments;
   wherein, the sensing device communicates a location of the work zone to the controller; and
   further wherein, the light control module operably controls, by enabling or disabling the light emission from one or more of individual pixels or one or more of the individual pixel segments of the array field light to project the light emission to illuminate the work zone in which the work tool performs the work function;
   further wherein, the work tool comprises a bucket configured to dump or retrieve material into or from a container;
   further wherein, the sensing device detects the work zone as being defined between a lower portion of the bucket and the container; and
   further wherein, the light emission illuminates the work zone between the lower portion and the container.

13. The work vehicle of claim 12, wherein the illumination of the work zone is visible from the work space in the cab.

14. The work vehicle of claim 12, wherein the array field light comprises a high-definition pixel LED lighting module.

15. The work vehicle of claim 12, wherein the sensing device comprises a camera, a proximity sensor, a light, or a combination thereof.

16. The work vehicle of claim 12, further comprising control logic executable by the controller to activate only one or more pixel segments of the array field light to illuminate the work zone.

17. The work vehicle of claim 16, wherein the control logic comprises information relative to a design or shape of the chassis, the cab, or the work tool.

18. A control system of an off-road agricultural work vehicle having coupled thereto an agricultural work implement including a plurality of row units configured to distribute seed, fertilizer, or both to a work zone, comprising:
   a controller for controlling the agricultural work vehicle;
   a light control module for controlling a lighting system of the agricultural work vehicle, the lighting system including an array field light;
   a sensing device comprising a camera disposed in communication with the controller;
   wherein, the array field light is operably controllable by the controller to project a light emission;
   wherein, the sensing device comprising the camera identifies an issue with a first row unit of the plurality of row units that prevents the first row unit from functioning properly and a location to be illuminated by the array field light to the controller, wherein the location includes the work zone in which the first row unit is configured to distribute seed, fertilizer, or both; and
   further wherein, the light control module operably controls the light emission of the array field light to direct substantially an entire light emission of the array field light at the first row unit and at the work zone in which the first row unit is configured to distribute seed, fertilizer, or both.

* * * * *